US008660623B2

(12) United States Patent
Man et al.

(10) Patent No.: US 8,660,623 B2

(45) Date of Patent: Feb. 25, 2014

(54) MOBILE WIRELESS DEVICE WITH INTEGRATED ANTENNA AND AUDIO TRANSDUCER ASSEMBLY AND RELATED METHODS

(75) Inventors: Ying Tong Man, Waterloo (CA); Yihong Qi, Waterloo (CA); Joshua Kwan Ho Wong, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 417 days.

(21) Appl. No.: 12/902,363

(22) Filed: Oct. 12, 2010

(65) Prior Publication Data

US 2011/0111814 A1 May 12, 2011

Related U.S. Application Data

(60) Provisional application No. 61/250,923, filed on Oct. 13, 2009.

(51) Int. Cl.
*H04M 1/00* (2006.01)

(52) U.S. Cl.
USPC .................. 455/575.5; 455/575.1; 455/575.7; 455/550.1; 455/90.3; 455/269; 455/562; 455/556.1; 455/422.1; 455/575.93; 455/67.13; 343/895; 343/772; 343/781; 343/872; 343/756; 343/812; 343/878; 343/88; 343/901; 343/702

(58) Field of Classification Search
USPC ............ 455/575.1, 575.5, 575.7, 550.1, 90.3, 455/269, 550, 562, 556.1, 422.1, 575.9, 455/462, 67.13; 343/895, 772, 781, 872, 343/756, 812, 878, 788, 901, 702, 713, 715
See application file for complete search history.

(56) References Cited

U.S. PATENT DOCUMENTS

| | | | | |
|---|---|---|---|---|
| 5,748,512 | A | 5/1998 | Vargas | 364/709.12 |
| 6,160,354 | A | 12/2000 | Ruvinskiy et al. | 315/169.3 |

(Continued)

FOREIGN PATENT DOCUMENTS

| | | | |
|---|---|---|---|
| CA | 2515558 | 2/2007 | H04B 1/38 |
| EP | 1686648 | 8/2006 | H04B 1/38 |

(Continued)

OTHER PUBLICATIONS

"*Physical Limitations of Omnidirectional Antennas*" Technical Report No. 64; May 1, 1946, Research Laboratory of Electronics—Massachusetts Institute of Technology.

(Continued)

*Primary Examiner* — Ping Hsieh
*Assistant Examiner* — Ganiyu A Hanidu
(74) *Attorney, Agent, or Firm* — Allen, Dyer, Doppelt, Milbrath & Gilchrist, P.A.

(57) ABSTRACT

A mobile wireless communications device may include a portable housing, a circuit board carried by the portable housing, a wireless communications circuit carried by the circuit board, and an audio circuit carried by the circuit board. The device may further include an antenna assembly including an antenna carrier frame coupled to the circuit board and defining a cavity therein, and at least one antenna element carried on the carrier frame and coupled to the wireless communications circuit. The device may also include an audio output transducer carried within the cavity of the antenna carrier frame and coupled to the audio circuit.

16 Claims, 11 Drawing Sheets

(56) References Cited

U.S. PATENT DOCUMENTS

| | | | | |
|---|---|---|---|---|
| 6,834,181 | B2 | 12/2004 | Kaikuranta et al. | 455/90.3 |
| 7,321,336 | B2 | 1/2008 | Phillips et al. | 343/702 |
| 7,369,092 | B1 | 5/2008 | Wen et al. | 343/702 |
| 2004/0108959 | A1* | 6/2004 | Park et al. | 343/702 |
| 2005/0270242 | A1* | 12/2005 | Qi et al. | 343/702 |
| 2006/0038733 | A1* | 2/2006 | Wedel et al. | 343/795 |
| 2006/0172785 | A1* | 8/2006 | Phillips et al. | 455/575.1 |
| 2007/0080889 | A1 | 4/2007 | Zhang | 343/895 |
| 2007/0171158 | A1 | 7/2007 | Kumar | 345/82 |
| 2007/0247429 | A1 | 10/2007 | Westerman | 345/168 |
| 2008/0101589 | A1* | 5/2008 | Horowitz et al. | 379/388.03 |
| 2008/0316116 | A1* | 12/2008 | Hobson et al. | 343/702 |
| 2009/0046022 | A1 | 2/2009 | Desclos et al. | 343/702 |
| 2009/0231206 | A1 | 9/2009 | Shamblin et al. | 343/700 |
| 2010/0076583 | A1* | 3/2010 | Wojack et al. | 700/103 |

FOREIGN PATENT DOCUMENTS

| | | | |
|---|---|---|---|
| FR | 2833128 | 6/2003 | H04M 1/38 |
| WO | 03/077507 | 9/2003 | |
| WO | 03/107168 | 12/2003 | |

OTHER PUBLICATIONS

McLean, James "*A Re-Examination of the Fundamental Limits on the Radiation Q of Electrically small Antennas*"; IEEE Transactions on Antennas and Propagation, vol. 44, No. 5, May 1996. 0018-926x/96.

Cheng et al. "*Temporal Vision-Guided Energy Minimization for Portable Displays" Low Power Electronics and Design, 2006. ISLPED'06. Proceedings of the 2006 International Symposium.* (Abstract only).

Himber et al. "*On-line personalization of a touch screen based keyboard*" http://portal.acm.org/citation.cfm?DOID=60405.604061#abstract (Abstract only).

Niccholson, Martin "*Flexible Printed Antennas Span 100 kHz to 40GHz*" www.mwrf.com/articles: Nov. 2001.

Thompson et al, "*Microstrip Antenna Arrays on Multilayer LCP Substrates*" www.techbriefs.com/component/content/article/1098-lew-1798: Jan. 1, 2007.

Chung et al. *Recent Advances in the Development of a Lightwieght, Flexible 16x16 Antenna Array with RF MEMS Shifters at 14 GHz*: Sep. 2009.

Caimi, et al. "*iMAT—Isolated Mode Antenna Technology*" SkyCross Inc. Jan. 2008.

* cited by examiner

| DESCRIPTION | THICKNESS (μm) | MATERIAL P/N |
|---|---|---|
| POLYIMIDE | 12 | CVA0515KA |
| ADHESIVE | 12 | |
| COPPER | 12 | MB 121612 REQ |
| POLYIMIDE | 16 | |
| COPPER | 12 | |
| ADHESIVE | 12 | CVA0515KA |
| POLYIMIDE | 12 | |
| PSA | 50 | 3M9671LE |
| | 138 (μm) | |

MOBILE WIRELESS DEVICE WITH INTEGRATED ANTENNA AND AUDIO TRANSDUCER ASSEMBLY AND RELATED METHODS

CROSS-REFERENCE TO RELATED APPLICATIONS

This application is based upon prior filed provisional application Ser. No. 61/250,923 filed Oct. 13, 2009, the disclosure of which is incorporated herein by reference in its entirety.

TECHNICAL FIELD

The present disclosure generally relates to the field of wireless communications systems, and, more particularly, to mobile wireless communications devices and related methods.

BACKGROUND

Mobile wireless communications systems continue to grow in popularity and have become an integral part of both personal and business communications. For example, cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. One challenge this poses for cellular device manufacturers is designing antennas that provide desired operating characteristics within the relatively limited amount of space available for antennas.

DETAILED DESCRIPTION

Figure 1:
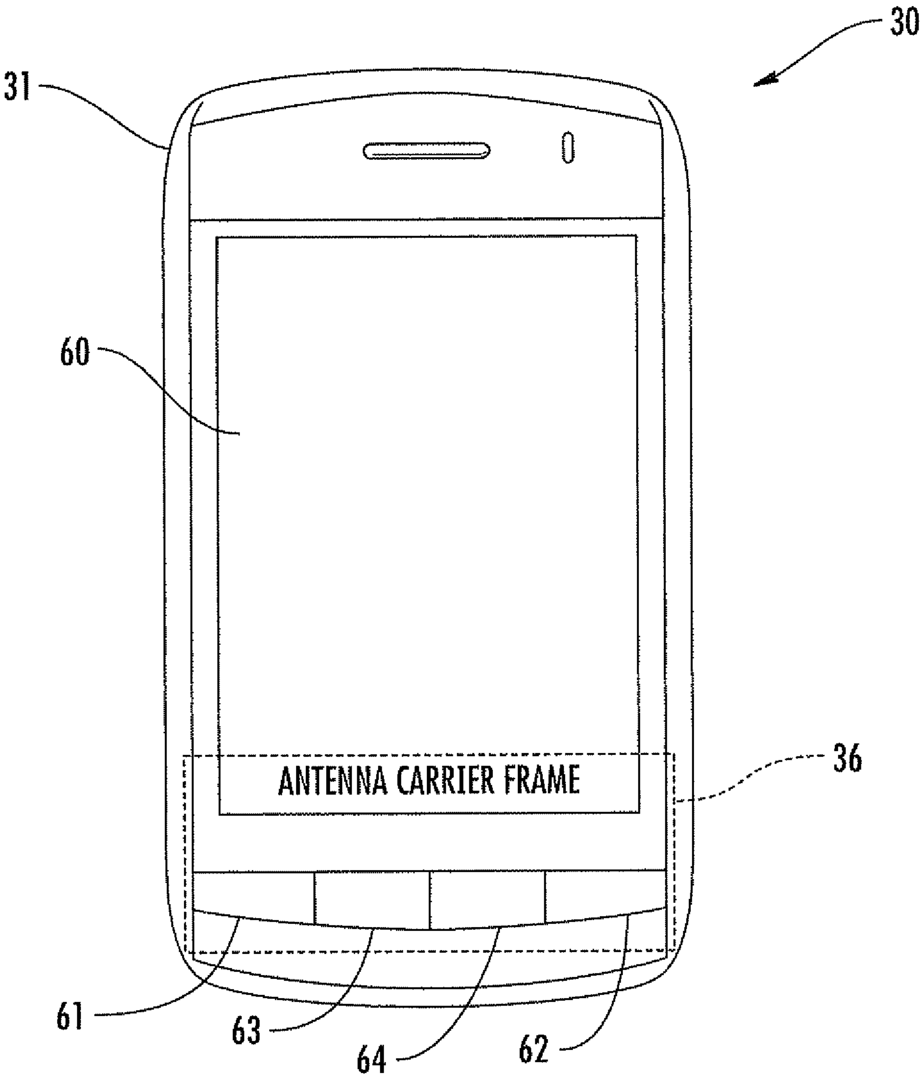
FIG. 1 is front view of a mobile wireless communications device including an antenna structure in accordance with one exemplary aspect.

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in alternative embodiments.

In accordance with one exemplary aspect, a mobile wireless communications device may include a portable housing having an upper portion and a lower portion, a circuit board carried by the portable housing, and a wireless communications circuit carried by the circuit board. Furthermore, a first audio output transducer may be carried in the upper portion of the portable housing and connected to the wireless communications circuit, and an audio input transducer may be carried in the lower portion of the portable housing and connected to the wireless communications circuit. The mobile wireless communications device may further include an audio circuit carried by the circuit board, as well as an antenna assembly including an antenna carrier frame coupled to the circuit board and defining a cavity therein, and at least one antenna element carried on the antenna carrier frame and coupled to the wireless communications circuit. In addition, a second audio output transducer may be carried within the cavity of the antenna carrier frame and coupled to the audio circuit. As such, the antenna assembly and second audio circuit may advantageously provide space-saving features, yet while still providing respective types of audio output transducers suited for different types of audio playback (e.g., voice audio, music audio, etc.).

In addition, the antenna carrier frame may further define an acoustic port therein. Furthermore, the mobile wireless communications device may also include a gasket carried by the antenna carrier frame within the acoustic port. The antenna carrier frame may also have a plurality of surfaces, and the at least one antenna element may comprise at least one wrap-around antenna element carried on a plurality of surfaces of the antenna carrier frame.

The antenna assembly may also include a flexible substrate carried on at least one surface of the antenna carrier frame, and the at least one antenna element may be carried on the flexible substrate. Furthermore, the audio circuit may comprise an audio data storage device and an audio output amplifier coupled thereto. At least one filter element may also be coupled between the audio circuit and the second audio output transducer. The audio circuit may be coupled to the wireless communications circuit. By way of example, the wireless communications circuit may comprise a cellular communications circuit.

A method for using a mobile wireless communications device, such as the one described briefly above, is also provided. The method may include selectively playing analog audio signals from the wireless communications circuit via the first audio output transducer, and selectively playing analog audio signals from the audio circuit via the second audio output transducer.

Referring initially to FIGS. 1 through 9, a mobile wireless communications device 30 illustratively includes a portable housing 31, a circuit board 32 (e.g., a printed circuit board (PCB)) carried by the portable housing, one or more wireless communications circuits 33 carried by the circuit board, and one or more audio circuits 34 carried by the circuit board. The device 30 further illustratively includes an antenna assembly 35 including an antenna carrier frame 36 that is removably coupled to the circuit board 32. More particularly, the antenna carrier frame 36 is shown coupled to the circuit board 32 in FIG. 2, and decoupled from the circuit board in FIG. 3. The exemplary device 30 further illustratively includes a display 60 and a plurality of control keys including an "off hook" (i.e., initiate phone call) key 61, an "on hook" (i.e., discontinue phone call) key 62, a menu key 63, and a return or escape key 64. Operation of the various device components and input keys, etc., will be described further below with reference to FIG. 14.

Figure 6:
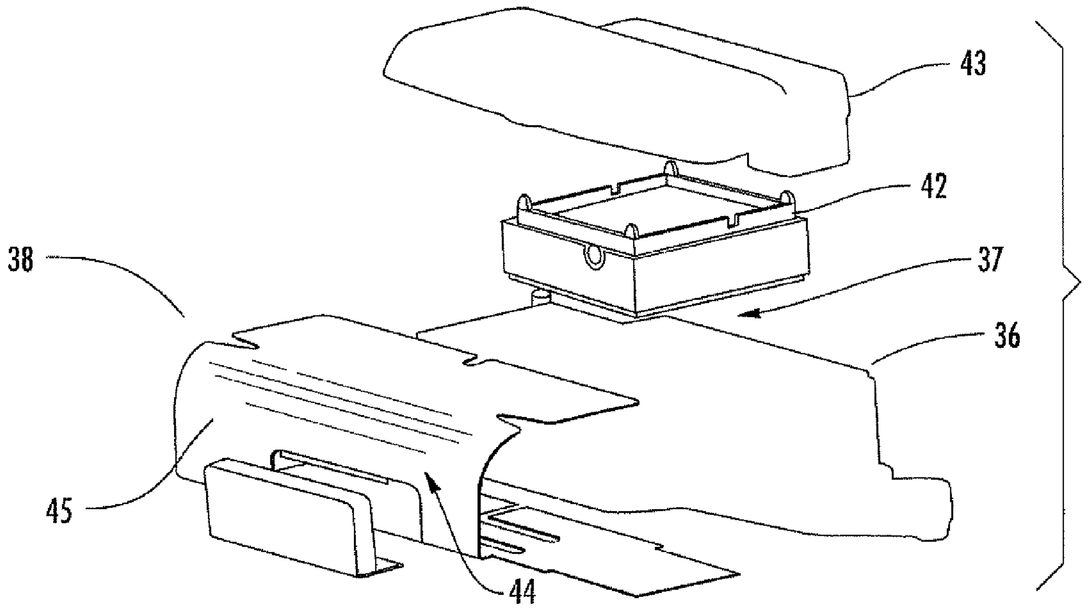
FIG. 6 is an exploded view of the antenna/speaker assembly of FIG. 5.
Figure 7:
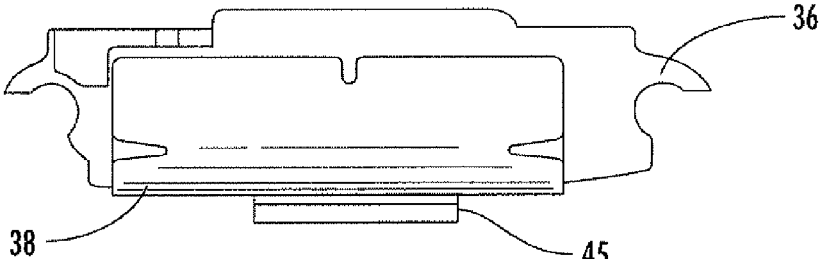
FIG. 7 is a front view of the antenna/speaker assembly of FIG. 5.
Figure 8:
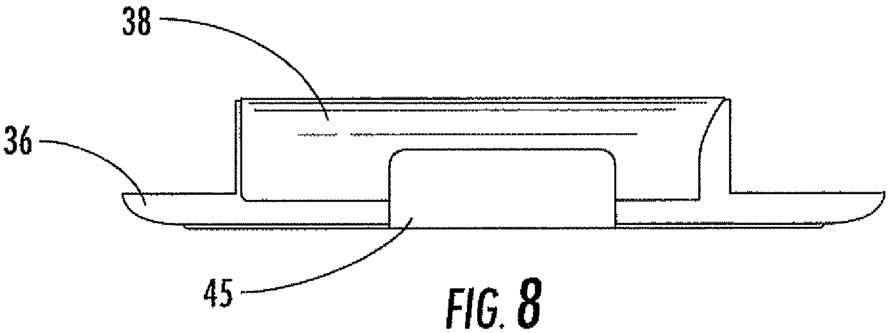
FIG. 8 is a bottom view of the antenna/speaker assembly of FIG. 5.
Figure 9:
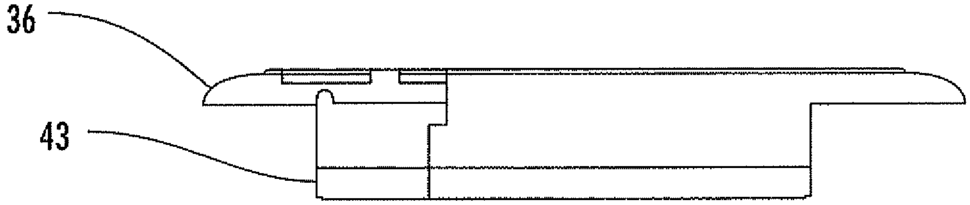
FIG. 9 is a top view of the antenna/speaker assembly of FIG. 5.

As seen in FIG. 6, the antenna carrier frame 36 defines a cavity 37 therein, and a flex antenna 38 is carried on front (FIG. 7), bottom (FIG. 8), and back (see FIG. 6) surfaces of the antenna carrier frame 36. That is, the antenna elements 40, 41 may be conceptually considered as "wrap around" antenna elements which overlie a plurality of different surfaces of the antenna carrier frame 36 (and a lid 43 therefor, as will be discussed further below). In the illustrated example, the flex antenna 38 includes a flexible substrate and a plurality of capacitively coupled antenna elements 40, 41. In particular, the antenna element 40 is a folded inverted F antenna, while the element 41 is a monopole antenna, although a single antenna element or different combinations of elements (e.g., multiple monopoles and/or multiple inverted F elements) may be used in different embodiments.

Figure 3:
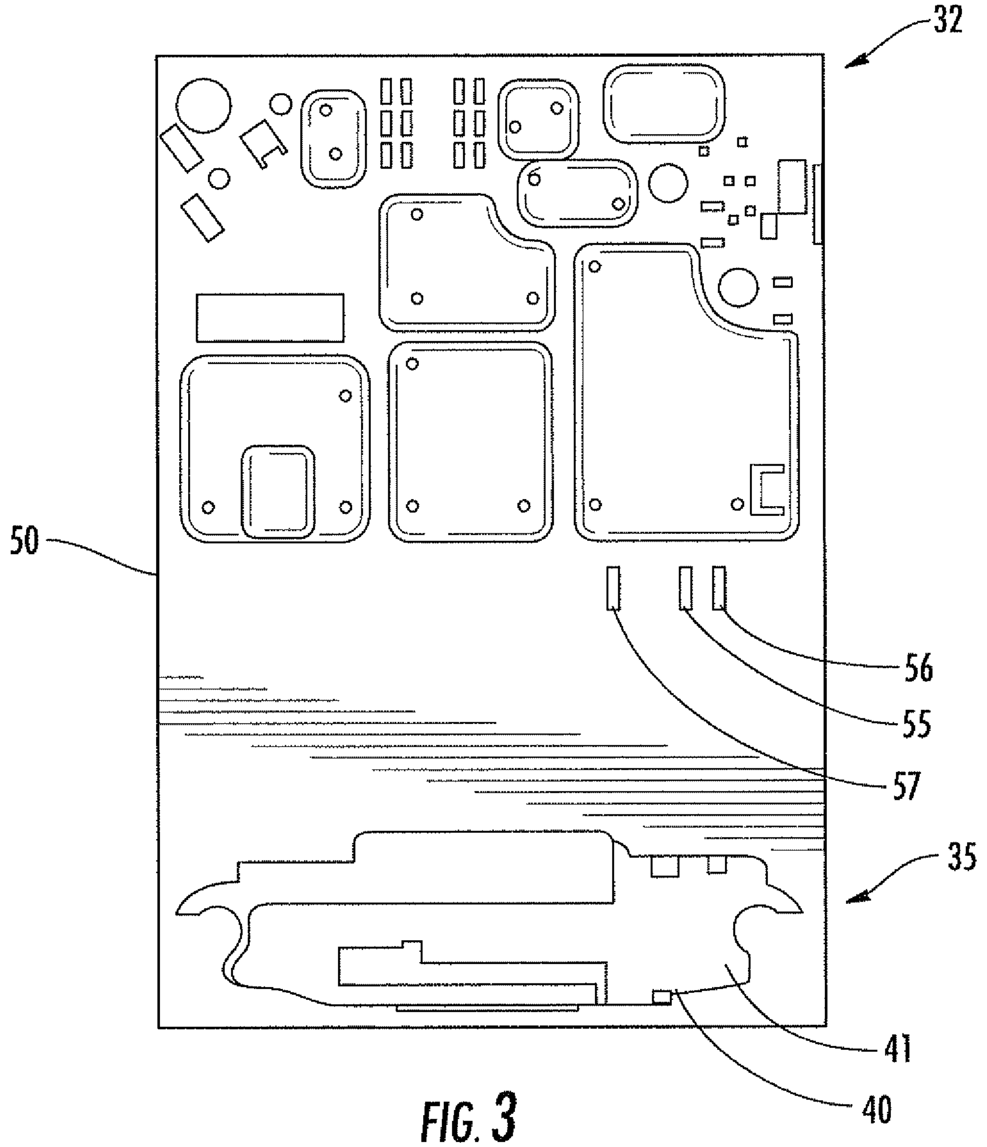
FIG. 3 is a front view of the circuit board and removable antenna/speaker assembly of FIG. 2 with the assembly decoupled from the circuit board.
Figure 4:
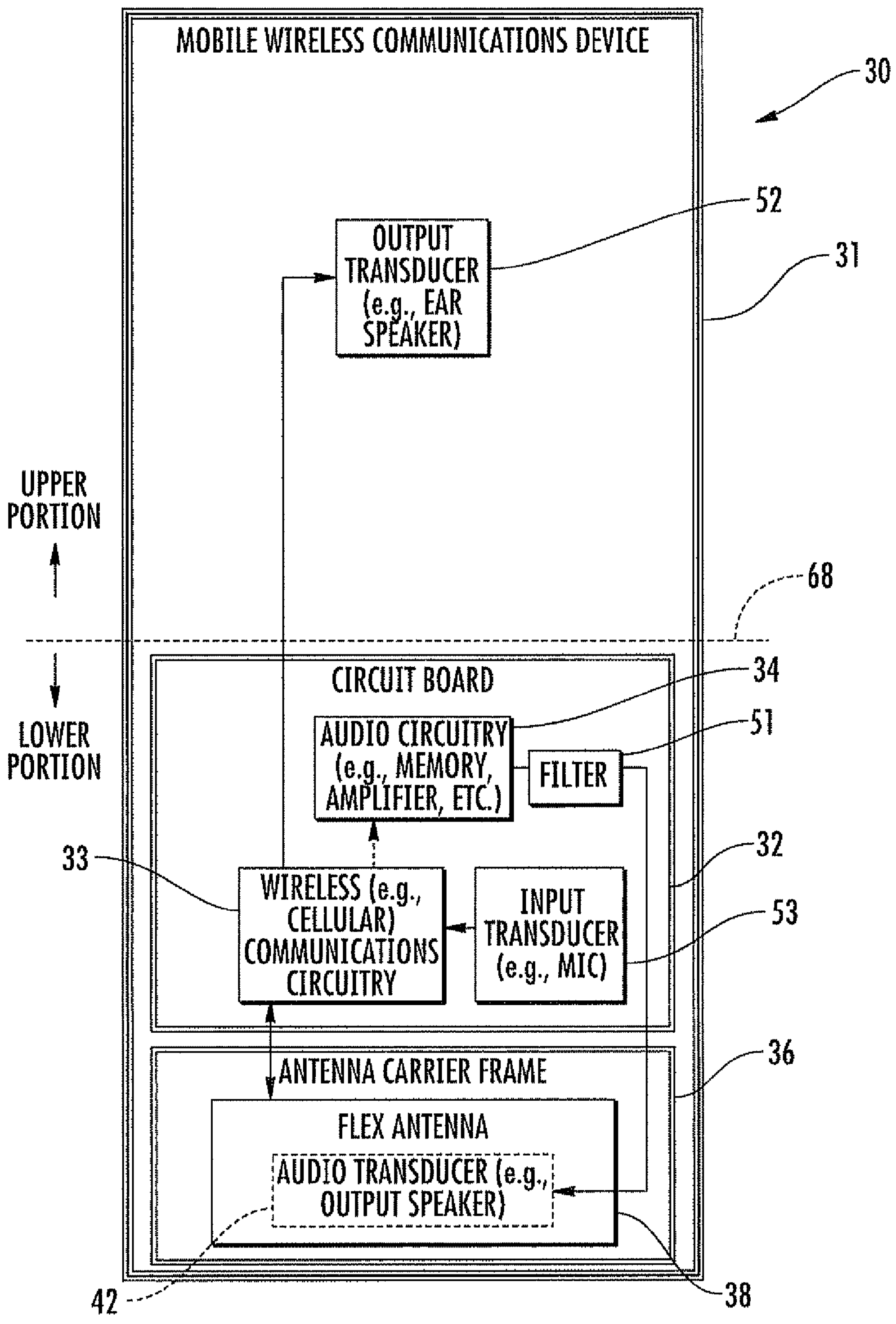
FIG. 4 is a schematic block diagram of the circuit board and removable antenna/speaker assembly of FIG. 2.
Figure 5:
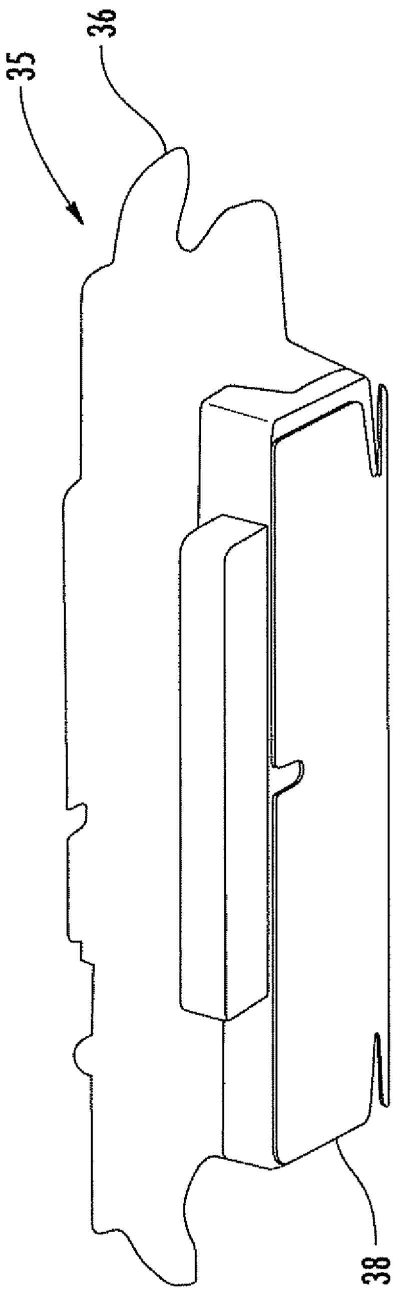
FIG. 5 is a perspective view of the antenna/speaker assembly of FIG. 2.

As shown in FIG. 4, the antenna element(s) is electrically coupled to the wireless communications circuit or circuitry 33, which may comprise one or more cellular transceivers, for example. In the present example, the antenna elements 40, 41 provide penta-band operation in the GSM 850/950, DCS, PCS, and UMTS frequency band ranges, as will be appreciated by those skilled in the art. However, in other embodiments different numbers and types of frequency bands may be used. For example, the flex antenna 38 and wireless communications circuitry 33 may operate over other wireless communications frequency bands, such as WiFi (e.g., 802.11x, WiMax, Bluetooth), satellite positioning system bands (e.g., GPS, Galileo, GLONASS, etc.). In the illustrated embodiment, a separate Bluetooth antenna 50 is carried on the circuit board 32 (see FIGS. 2 and 3).

Figure 2:
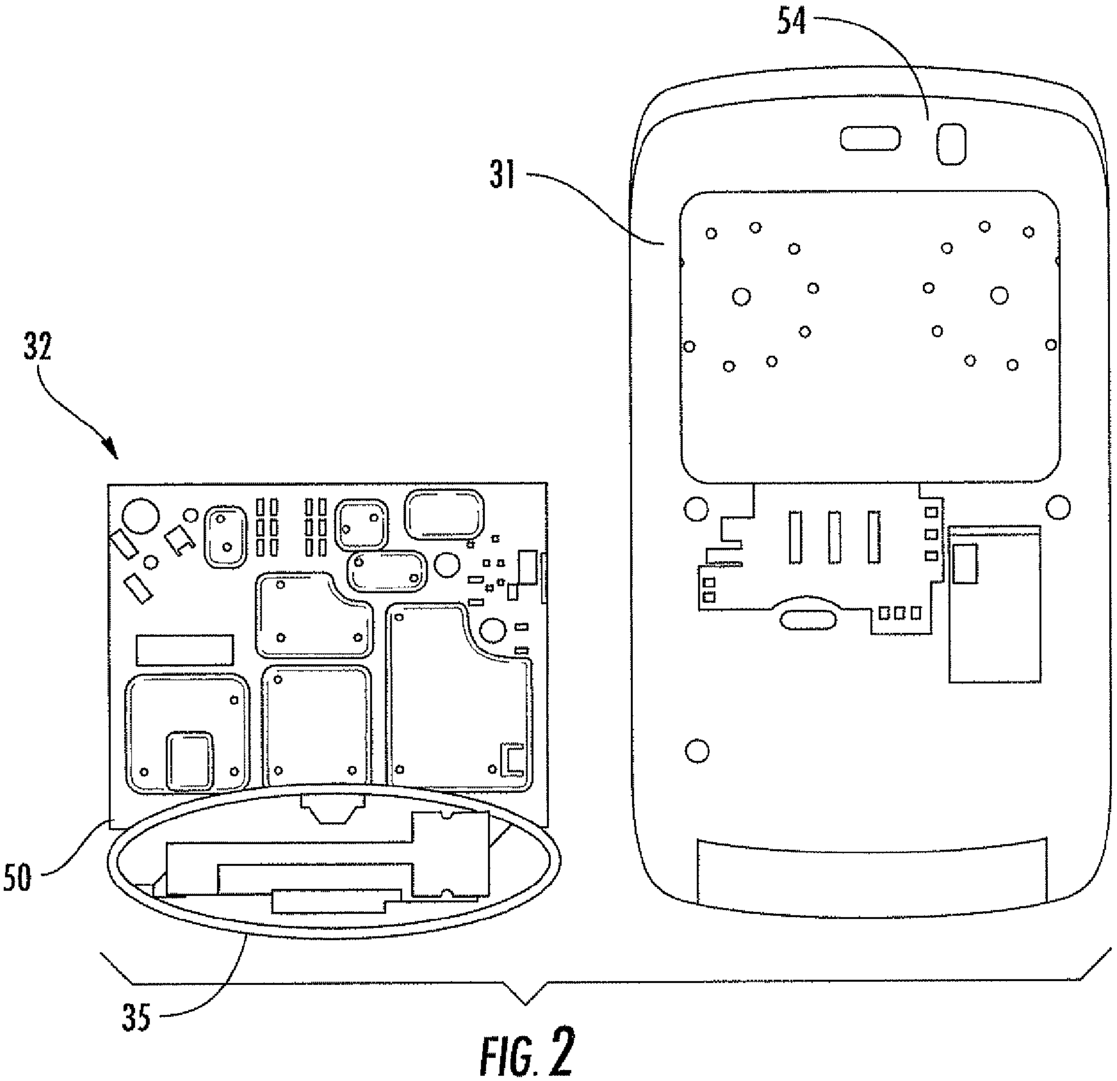
FIG. 2 is a rear view of the device of FIG. 1 with the battery cover removed, and the circuit board for the device with a removable antenna/speaker assembly coupled thereto.

The device 30 further illustratively includes an audio output transducer 42 carried within the cavity 37 of the antenna carrier frame 36 and coupled to the audio circuit 34. This arrangement advantageously conserves scarce surface area or "real estate" on the circuit board 32, which as may be seen in FIGS. 2 and 3 is used for other device components. That is, by co-locating the antenna carrier frame 36 and audio output transducer 42 in the same vertically overlapping space, this preserves a significant amount of circuit board 32 space that may advantageously be used for other components.

Moreover, in the present embodiment, the audio output transducer 42 is a loudspeaker, such as for playing music. In this regard, the audio circuitry 34 may include a data storage device (e.g., FLASH memory) for storing digital music or audio files (e.g., MP3, WAV, etc.), a digital-to-analog (D/A) converter, and an audio output amplifier for outputting the analog audio signals via the loudspeaker. In some embodiments, one or more electromagnetic (EM) filter elements 51 (e.g., ferrite bead, etc.) may be coupled between the audio circuitry 34 and the audio transducer 42 to avoid undesired interference from the antenna elements 40, 41, as will be appreciated by those skilled in the art. In this regard, depending upon the given implementation, it may be desirable to route the lead lines for the audio transducer 42 and/or the antenna elements 40, 41 to avoid high coupling points. Such points will vary depending upon the given operating frequencies and radiation patterns of the antenna being used, as will also be appreciated by those skilled in the art.

The antenna carrier frame 36 may advantageously provide an acoustic enclosure for the loudspeaker 42 to enhance the sound characteristics of the audio output, as will be appreciated by those skilled in the art. In this regard, a lid 43 may also be provided for the antenna carrier frame 36 to enclose or encapsulate the audio output transducer within the cavity 37, as seen in FIG. 6, which not only provides a proactive covering for the transducer but may also further advantageously enhance the fidelity of the audio output, as will also be appreciated by those skilled in the art. The lid 43 also provides an additional surface (i.e., a back surface) on which the flex antenna 38 may be overlayed (see FIG. 7), as noted above. However, it should be noted that in some embodiments the lid 43 need not be included. The lid 43 and antenna carrier frame 36 may be made of dielectric materials such as plastic, although other materials may also be used to provide different sound enhancement in different embodiments.

The antenna carrier frame 36 also illustratively defines an acoustic port 44 therein, in which a speaker gasket 45 is positioned or carried (see FIG. 6). By way of example, the speaker gasket 45 may comprise a rubber material with a fabric mesh thereon, although other acoustically suitable materials may also be used in different embodiments, as will be appreciated by those skilled in the art. As a result of this configuration, the audio output transducer 42 may advantageously be positioned in relatively close proximity to the lid 43 to provide still further space savings. In the example illustrated in FIGS. 2 and 3, this spacing is approximately 0.6 mm, although other spacings may be used in different embodiments.

In the exemplary wireless phone implementation, the device 30 further illustratively includes another audio output transducer 52 carried in an upper portion (or half) of the portable housing 31, and an audio input transducer 53 carried in a lower portion (or half) of the portable housing, each of which is connected to the wireless communications circuitry 33, as shown in FIG. 4. The upper and lower portions of the portable housing 31 are separated by an imaginary horizontal centerline 68 in FIG. 4. More particularly, the audio output transducer 52 provides a telephonic ear speaker for a user's ear, and the audio input transducer 53 provides a microphone for receiving the user's voice during a phone conversation, as will be appreciated by those skilled in the art.

It will therefore be appreciated that the antenna assembly 35 is positioned in the lower portion (i.e., bottom) of the portable housing 31. Such placement may advantageously reduce undesirable coupling of the antenna elements 40, 41 to other components located at the upper portion (i.e., top) of the device 30, such as a separate satellite positioning antenna, a camera circuit 54 (FIG. 4), and/or the output transducer 52, which may be particularly important to achieve applicable hearing aid compatibility (HAC) requirements. Moreover, placement of the antenna assembly 35 in the lower portion of the housing 31 may also advantageously lower the specific absorption rate (SAR) of the device 30, since this places the antenna further away from the user's brain than placement in the upper portion as found in many traditional cellular phone designs.

Figure 13:
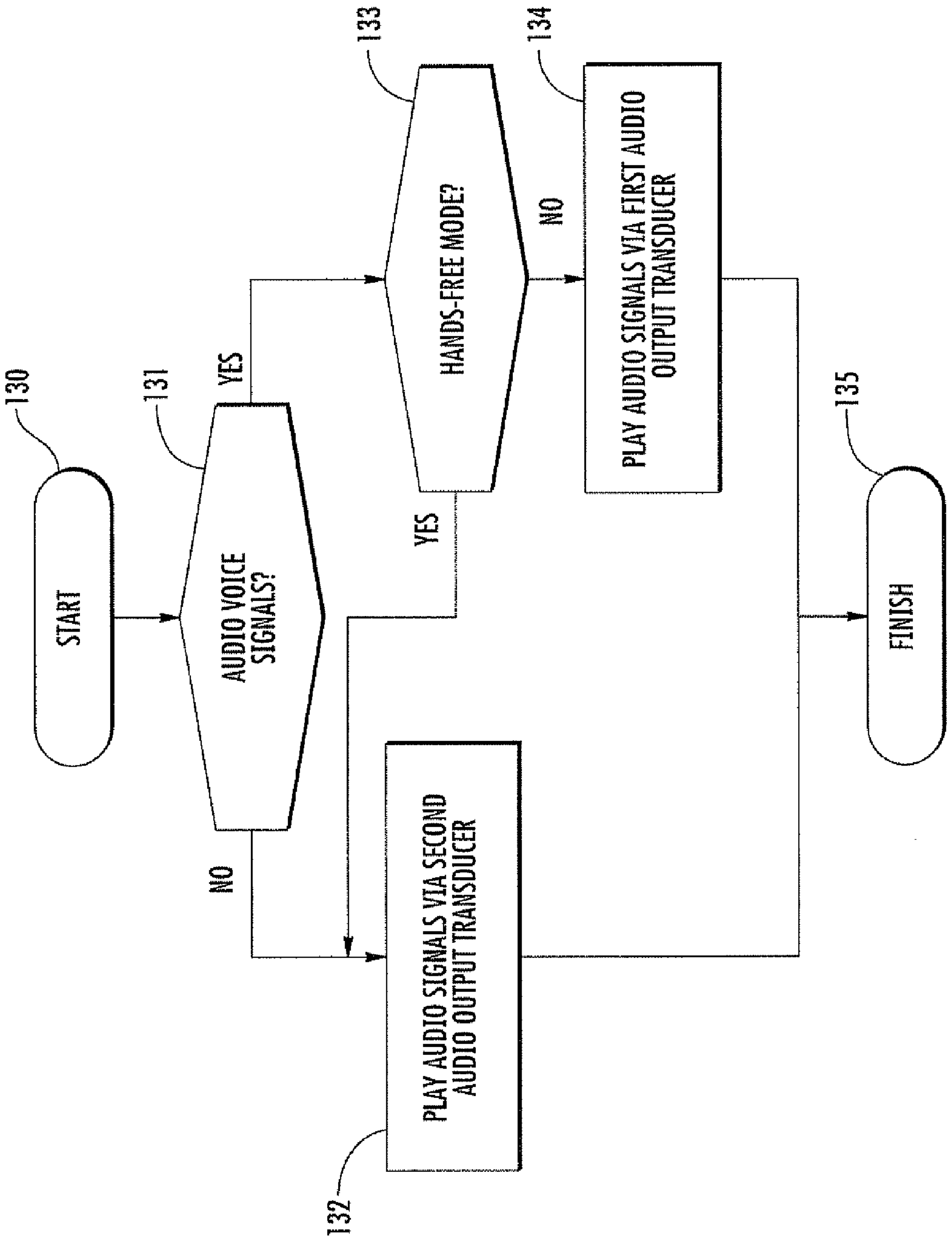
FIG. 13 is a flow diagram illustrating a method of using the mobile device and antenna/speaker assembly of FIGS. 1 through 9.

An exemplary method for using the device 30 is now described with reference to FIG. 13. As noted above, the audio output transducer 52 may advantageously be used for playing audio voice signals, such as during a phone call, and the audio output transducer 42 may be used for other types of audio output such as music, etc. Accordingly, the audio output transducer 42 may be designed and constructed to provide a greater volume and a larger and flatter frequency range, that is, be of higher fidelity that the other audio output transducer B52.

Beginning at Block 130, if the audio output to be played is not audio voice signals, at Block 131, then this audio may advantageously be directed to the audio output transducer 42 (Block 132). In some embodiments, even if the audio output signals to be played are voice signals, they may still optionally be played on the audio output transducer 42. For example, the wireless communications circuitry 33 may also be coupled to the audio circuitry 34, and if the device 30 is in a hands-free or speakerphone mode (Block 133) then it may be desirable to instead play the voice audio via the audio output transducer 42, which may have better audio quality for relatively high volume applications for the reasons noted above. However, if the hands-free mode is not chosen, then the voice audio signals may be played via the audio output transducer 52, at Block 134, thus illustratively concluding the method of FIG. 13 (Block 135).

It will be noted that the antenna elements 40, 41 are closely capacitively coupled in the present example (see FIG. 3), such that these elements operate in an integral fashion in that the elements would not provide the same coverage patterns if they were spaced significantly farther apart, even though these antenna elements have different respective signal feeds provided via conductive spring connectors 55, 56. A voltage reference (e.g., ground) is also provided to the inverted F antenna 40 via a conductive spring connector 57. In this regard, a single antenna element could instead be used in some applications to provide desired multi-band coverage, if desired. In such cases, the single antenna element may similarly have a plurality of spaced apart signal feed points thereon coupled to the wireless communications circuitry 33, such as by the conductive spring connectors 55, 56. In addition, in some alternative embodiments an input transducer (e.g., the input transducer 53) or other devices may be positioned in the cavity 37 of the of the antenna carrier frame 36 in addition to (or instead of) the transducer 42, as will be appreciated by those skilled in the art.

Figure 10:
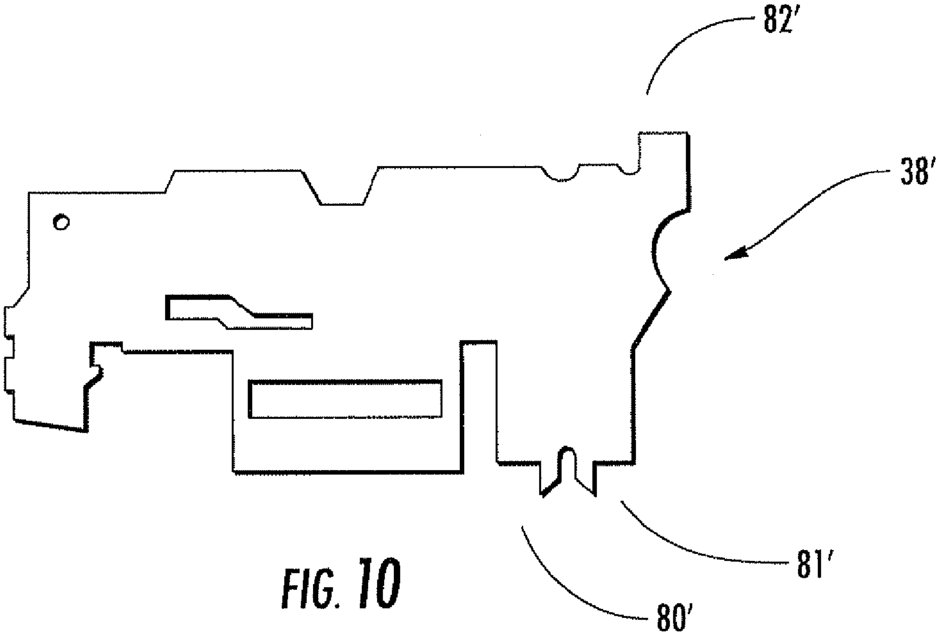
FIG. 10 is a front view of a multi-layer flex antenna assembly in accordance with an exemplary alternative embodiment.
Figure 11:
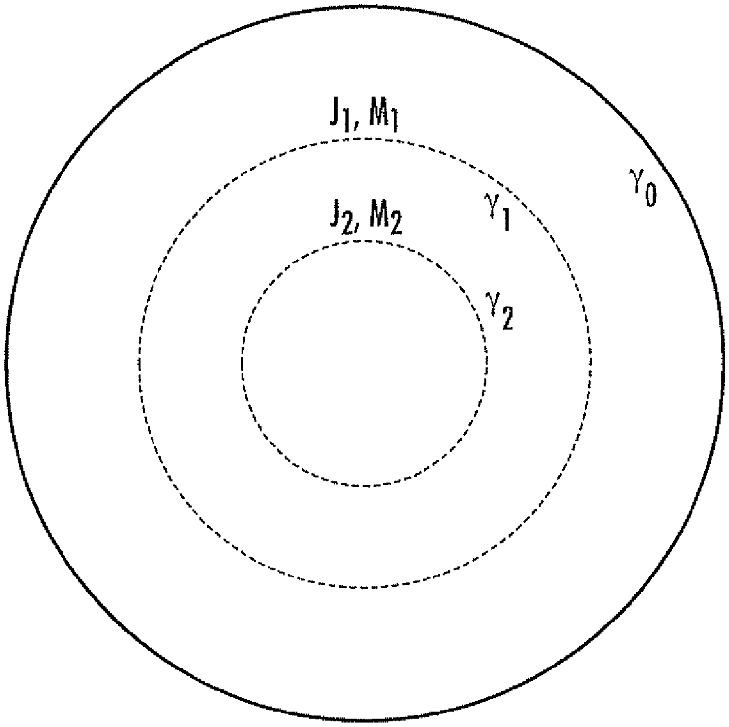
FIG. 11 is a conceptual current distribution diagram for the multi-layer flex antenna assembly of FIG. 10.
Figure 12:
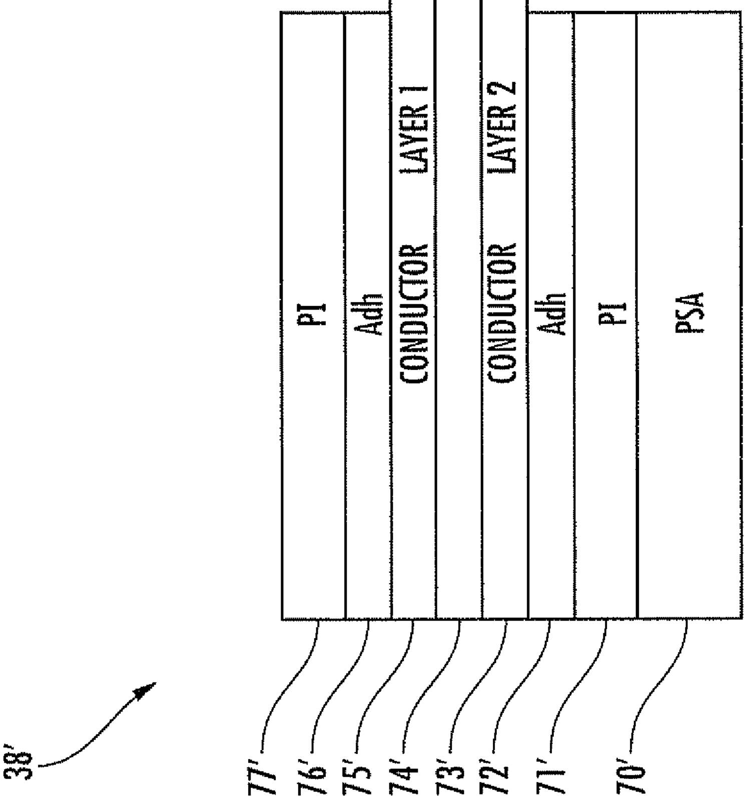
FIG. 12 is a cross-sectional diagram and corresponding layer legend describing the various layers of the multi-layer flex antenna assembly of FIG. 10.

Turning additionally to FIGS. 10-12, an alternative embodiment of a multi-layer flex antenna 38' is now described. By way of background, as global 3G (and 4G) cellular deployment increases, demand for data transmission capacity also increases. To address such demands, the wireless communication industry relies on various frequency bands to provide adequate bandwidth for consumer demands. At present over twenty bands exist ranging from 704 MHz to 2.7 GHz. A significant challenge to designing a cellular phone that operates in all of these bands is creating an antenna that has a large enough bandwidth to transmit or receive while having sufficient gain at these frequencies, yet which is compact enough to fit in a relatively small form factor. As will be discussed further below, the multi-layer flex antenna 38' advantageously addresses these technical problems by providing a penta-band main antenna for a mobile wireless communications device which covers operating frequencies from 824 MHz to 2.17 GHz, for example.

There are fundamental limits of antennas which may be understood by considering the entire antenna system including the oscillator, transmission lines, and the antenna itself. Now, consider a spherical volume with radius r enclosing the entire structure. The total energy outside the sphere is equal to the sum of the energies of a given set of current distribution (called mode hereafter) within the sphere.

The radiated power of the antenna is calculated from the propagating modes, while the non-propagating modes contribute to the reactive power. If the sphere enclosing the structure is very small, there exist no propagating modes. In this case, the Q of the system becomes large, and all modes are evanescent. Much like a resonator, the Q of each mode is defined as the ratio of energies. In the case of an antenna, Q is defined as the ratio of its stored energy to its radiated energy. For propagating modes, Q is given by the following equation (See Chu, "Physical Limitations of Omnidirectional Antennas," MIT Technical Report, No. 64, May 1948, and McLean, "A Re-Examination of the Fundamental Limits on the Radiation Q of Electrically Small Antennas," IEEE Trans. on Ant. and Prop., Vol. 44, No. 5, pp. 672-676, May 1996):

$$Q = \frac{1 + 2(kr)^2}{(kr)^3[1 + (kr)^2]},$$

where for kr<<1, the expression can be simplified to $$Q = \frac{1}{(kr)^3}.$$

This expression represents the fundamental limit on the electrical size of an antenna.

For a given mode, the fractional bandwidth is inversely proportional to Q and is given by the following relationship:

$$FBW = \frac{1}{Q}.$$

For example, within the same spherical volume, a dipole has kr≅0.62, whereas a Goubau antenna has kr≅1.04. See Balanis, "Antenna Theory Analysis and Design," 3rd Ed., John Wiley & Sons, Inc., Hoboken, N.J., 2005. In other words, the bandwidth of an antenna (which can be closed within a sphere of radius r) may be improved only if the antenna utilizes efficiently, with its geometrical configuration, the available volume within the sphere.

The flex antenna 38' design makes use of the above-described concept. Referring to FIG. 11, one set of modes, say $r_1$, contributes the radiation for GSM 850, 900, and DCS bands, while another mode, $r_2$, contributes the radiation for PCS and UMTS bands, as will be appreciated by those skilled in the art. For low frequencies, the smallest sphere that encloses the antenna structure would be affected by the equivalent source distribution on surface $r_1$ as shown. That is, beyond $r_1$, other modes become evanescent. To create propagating modes in the region where r is smaller than $r_1$, a different source distribution is used.

The flex antenna 38' advantageously uses a multi-layer structure to accomplish this. The flex antenna 38' illustratively includes a stack of layers which, from bottom to top as shown in FIG. 12, are listed along with their respective thicknesses as follows: a pressure sensitive adhesive (PSA) layer 70' (50 μm); a polyimide dielectric layer 71' (12 μm); an adhesive layer 72' (12 μm); a lower conductive (e.g., copper) layer 73' (12 μm); a polyimide spacer layer 74' (16 μm); an upper (e.g., copper) conductive layer 75' (12 μm); an adhesive layer 76' (12 μm); and a polyimide layer 77' (12 μm). The various adhesive and polyimide dielectric layers are advantageously flexible to allow placement of the flex antenna 38' to accommodate mechanical constraints, yet still provide the requisite support and protection for the conductive layers 73', 75'.

By way of example, the PSA layer 70' may be a 3M 9671 LE adhesive transfer tape from the 3M Company of St. Paul, Minn. Moreover, the layer groups 71'/72' and 76'/77' may be obtained in a combination polyimide/adhesive layer form, such as product number CVA0515KA from the Arisawa Mfg. Co., Ltd. of Japan. Furthermore, the copper layers 73', 75' may be implemented with Teraoka No. 831 from Teraoka Seisakusho Co., Ltd., and an exemplary intervening polymide layer 74' may be implemented with Permacel P-221 AMB from Nitto Denko America, Inc. The conductive layers 73', 75' are patterned (e.g., by etching, etc.) to the desired geometries before the layers are stacked to form the flex antenna 38'.

It should be noted that in different embodiments various types of suitable adhesive, dielectric spacer, and conductive materials may be used, as are well know to those skilled in the electronic circuit arts. Moreover, the thicknesses and numbers of the various layers may also be different in different embodiments. For example, in some embodiments more than two conductive layers may be included in the stack of dielectric/adhesive/conductive layers.

The lower conductive layer 73' determines the source distribution on $r_2$, and the conductive layer 75' determines the source distribution on $r_1$. In the example illustrated in FIG. 10, the flex antenna 38' includes feed points 80', 81' which provide signal and voltage reference (e.g., ground) connection points for the antenna. In some implementations an additional feed point 82' may also be used to provide a second signal feed point for the antenna 38', such that the single antenna has multiple signal feed points as described above.

A related method for making the device 30 may include positioning the audio circuitry 34 and wireless communications circuit 33 on the circuit board 32, and positioning the audio output transducer 42 within the cavity of the antenna carrier frame 36. The flex antenna assembly 38 is positioned on at least some of the surfaces of the antenna carrier frame 36, as discussed above. The method further includes positioning the circuit board 32 and antenna carrier frame 36 within the portable housing 31, and electrically coupling the audio output transducer 42 to the audio circuit 34 and the conductive layers 73', 75' to the wireless communications circuit. Of course, it will be appreciated by those skilled in the art that some of the above steps may be performed in different orders in various embodiments, and that other steps may also be performed (e.g., positioning of filter 51, input transducer, output transducer 52, etc.) in various orders depending upon the given implementation. Moreover, various components may be coupled to the circuit board 32 after it has already been placed within the portable housing 31, for example.

Other exemplary components that may be used in various embodiments of the above-described mobile wireless communications device are now described with reference to an exemplary mobile wireless communications device 1000 shown in FIG. 14. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 14:
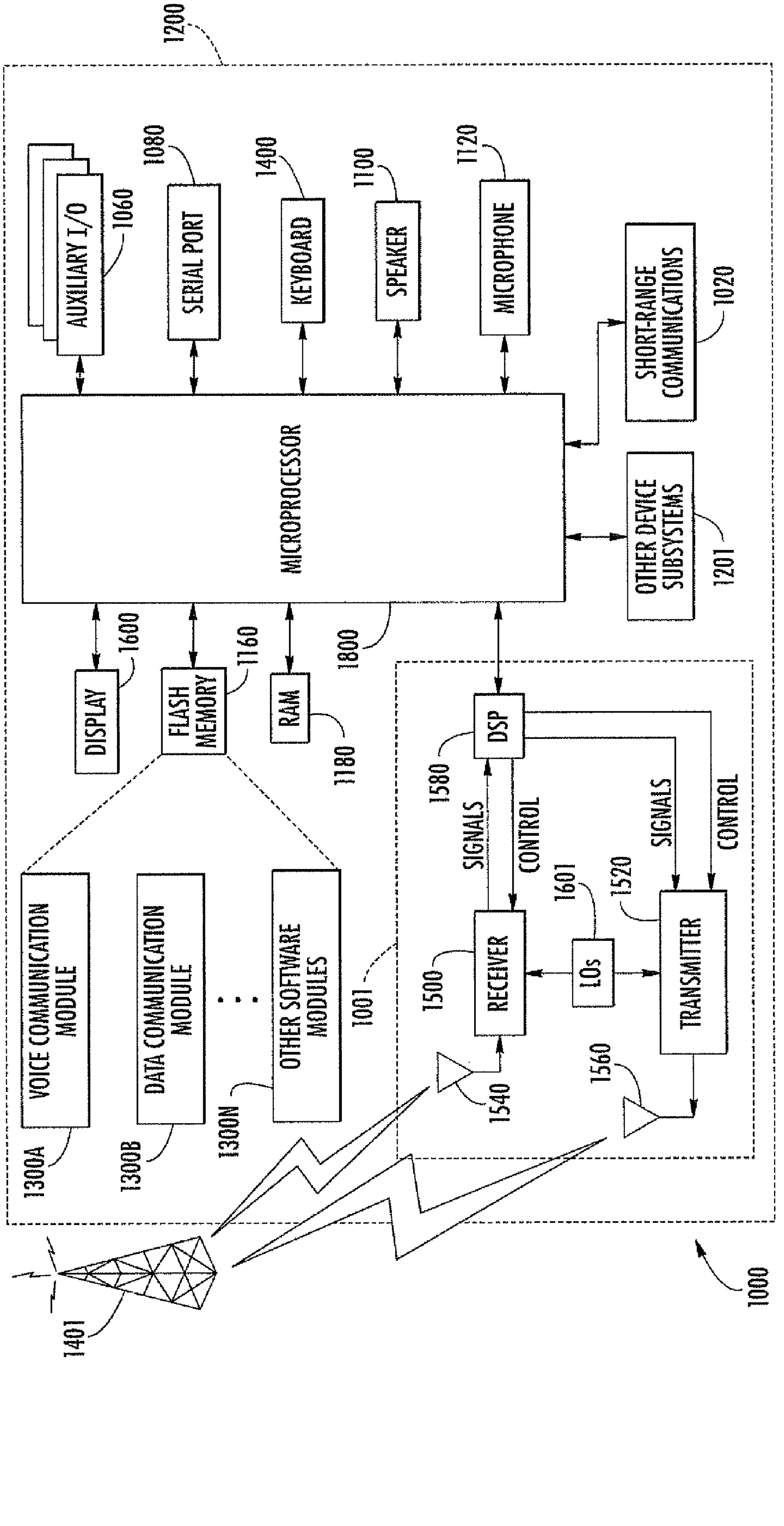
FIG. 14 is a schematic block diagram illustrating additional components that may be included in the mobile wireless communications device of FIG. 1.

In addition to the processing device 1800, other parts of the mobile device 1000 are shown schematically in FIG. 14. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOS) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, Near-Field Communication (NFC) or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included.

That which is claimed is:

1. A mobile wireless communications device comprising:

- a portable housing having an upper portion and a lower portion;
- a circuit board carried by the portable housing;
- a wireless communications circuit carried by the circuit board;
- a first audio output transducer carried in the upper portion of the portable housing and connected to the wireless communications circuit;
- an audio input transducer carried in the lower portion of the portable housing and connected to the wireless communications circuit;
- an audio circuit carried by the circuit board;
- an antenna assembly comprising
  - an antenna carrier frame coupled to the circuit board and defining a cavity therein and an acoustic port opening to the cavity, and
  - at least one antenna element carried on the antenna carrier frame and coupled to the wireless communications circuit;
- a second audio output transducer carried within the cavity of the antenna carrier frame and coupled to the audio circuit;
- a lid enclosing the second audio output transducer within the cavity of said antenna carrier frame; and
- an acoustic gasket carried by said antenna carrier frame within the acoustic port opening.

2. The mobile wireless communications device of claim 1 wherein the antenna assembly further comprises a flexible substrate carried on at least one surface of the antenna carrier frame; and wherein the at least one antenna element is carried on the flexible substrate.

3. The mobile wireless communications device of claim 1 wherein the audio circuit comprises an audio data storage device and an audio output amplifier coupled thereto.

4. The mobile wireless communications device of claim 1 further comprising at least one filter element coupled between the audio circuit and the second audio output transducer.

5. The mobile wireless communications device of claim 1 wherein the audio circuit is further coupled to the wireless communications circuit.

6. The mobile wireless communications device of claim 1 wherein the wireless communications circuit comprises a cellular communications circuit.

7. A mobile wireless communications device comprising:

- a portable housing having an upper portion and a lower portion;
- a circuit board carried by the portable housing;
- a wireless communications circuit carried by the circuit board;

a first audio output transducer carried in the upper portion of the portable housing and connected to the wireless communications circuit;

an audio input transducer carried in the lower portion of the portable housing and connected to the wireless communications circuit;

an audio circuit carried by the circuit board;

an antenna assembly comprising an antenna carrier frame having a plurality of surfaces and coupled to the circuit board and defining a cavity and an acoustic port opening to the cavity, and at least one wrap-around antenna element carried on at least some of the plurality of surfaces of the antenna carrier frame and coupled to the wireless communications circuit;

a second audio output transducer carried within the cavity of the antenna carrier frame and coupled to the audio circuit;

a lid enclosing the second audio output transducer within the cavity of said antenna carrier frame; and an acoustic gasket carried by said antenna carrier frame within the acoustic port opening.

8. The mobile wireless communications device of claim 7 wherein the antenna assembly further comprises a flexible substrate carried on at least one surface of the antenna carrier frame; and wherein the at least one antenna element is carried on the flexible substrate.

9. The mobile wireless communications device of claim 7 wherein the audio circuit comprises an audio data storage device and an audio output amplifier coupled thereto.

10. The mobile wireless communications device of claim 7 further comprising at least one filter element coupled between the audio circuit and the second audio output transducer.

11. The mobile wireless communications device of claim 7 wherein the audio circuit is further coupled to the wireless communications circuit.

12. A method for using a mobile wireless communications device comprising a portable housing having an upper portion and a lower portion, a circuit board carried by the portable housing, a wireless communications circuit carried by the circuit board, a first audio output transducer carried in the upper portion of the portable housing and connected to the wireless communications circuit, an audio input transducer carried in the lower portion of the portable housing and connected to the wireless communications circuit, an audio circuit carried by the circuit board, an antenna assembly comprising an antenna carrier frame coupled to the circuit board and defining a cavity therein with an acoustic port opening to the cavity and at least one antenna element carried on the antenna carrier frame and coupled to the wireless communications circuit, a second audio output transducer carried within the cavity of the antenna carrier frame and coupled to the audio circuit, a lid enclosing the second audio output transducer within the cavity of the antenna carrier frame, and an acoustic gasket carried by the antenna carrier frame within the acoustic port opening, the method comprising:

selectively playing analog audio signals from the wireless communications circuit via the first audio output transducer; and selectively playing analog audio signals from the audio circuit via the second audio output transducer.

13. The method of claim 12 wherein the audio circuit is further coupled to the wireless communications circuit; and wherein selectively playing analog audio signals from the wireless communications circuit further comprises selectively playing analog audio signals from the wireless communications circuit via the first and second audio output transducers.

14. The method of claim 12 wherein the antenna carrier frame has a plurality of surfaces; and wherein the at least one antenna element comprises at least one wrap-around antenna element carried on a plurality of surfaces of the antenna carrier frame.

15. The method of claim 12 wherein the antenna assembly further comprises a flexible substrate carried on at least one surface of the antenna carrier frame; and wherein the at least one antenna element is carried on the flexible substrate.

16. The method of claim 12 wherein the audio circuit comprises an audio data storage device and an audio output amplifier coupled thereto.

* * * * *